April 5, 1960 H. W. AUSTIN 2,931,042
PROTECTIVE HEADGEAR AND METHOD OF MAKING IT
Filed April 27, 1954 4 Sheets-Sheet 3

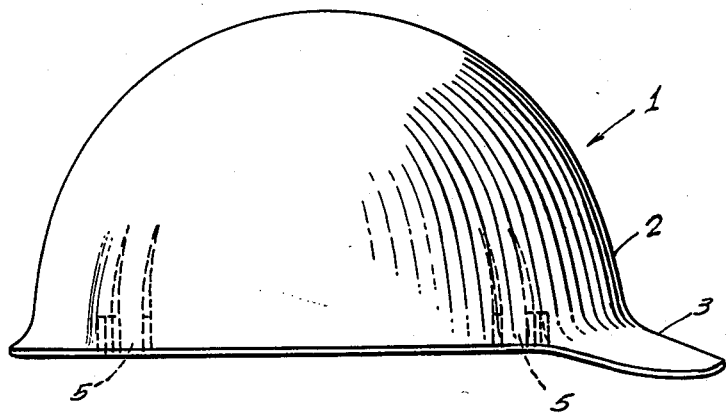
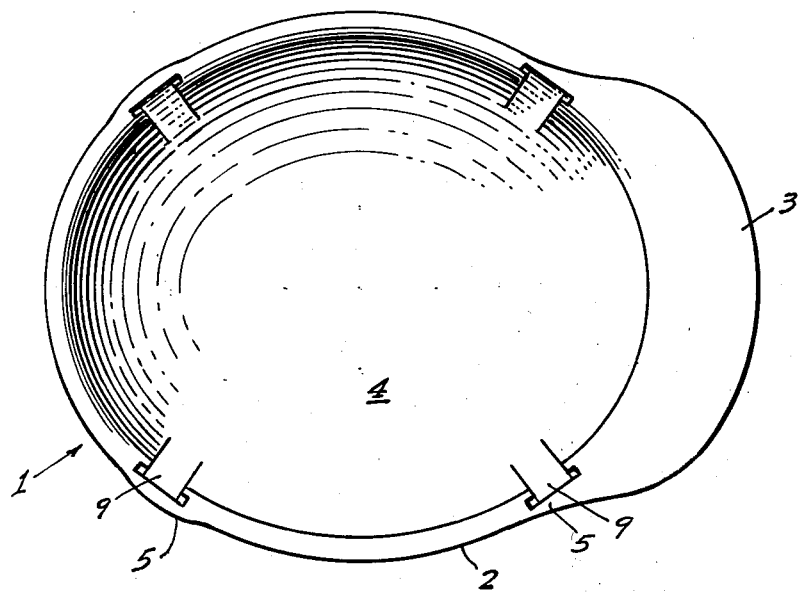

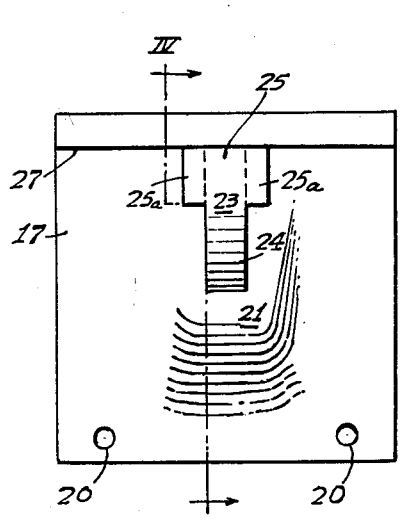
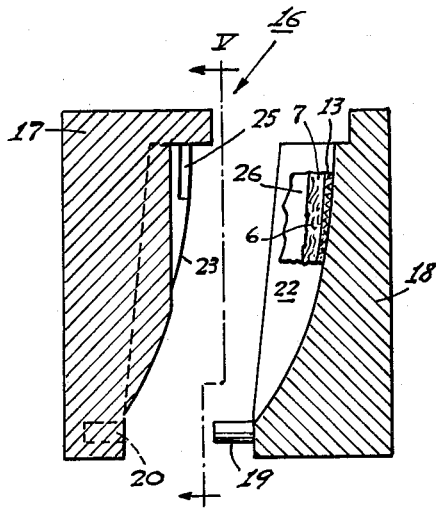
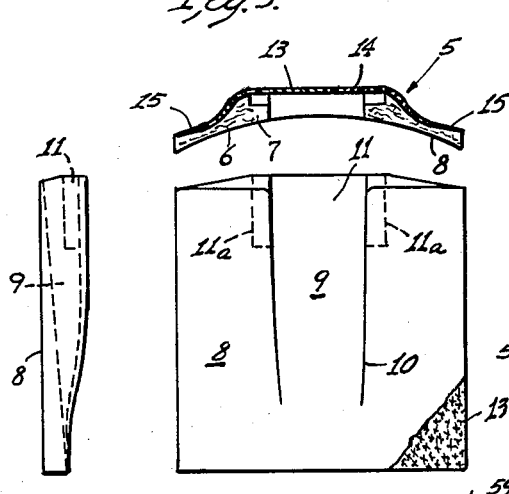
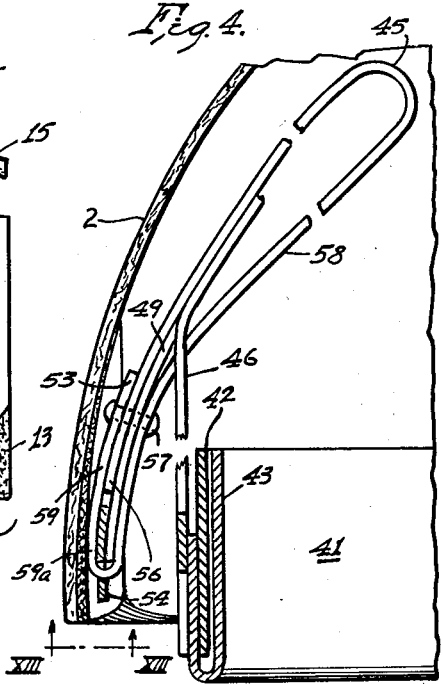
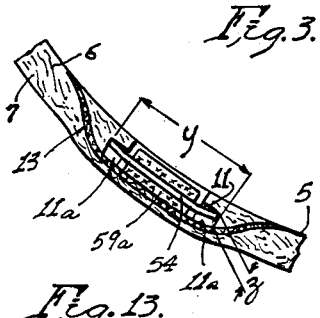
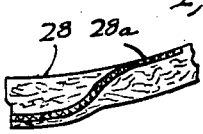
INVENTOR.
Harry W. Austin.

INVENTOR.
Harry W. Austin.
BY
Egon G. Shlepak
ATTORNEY:

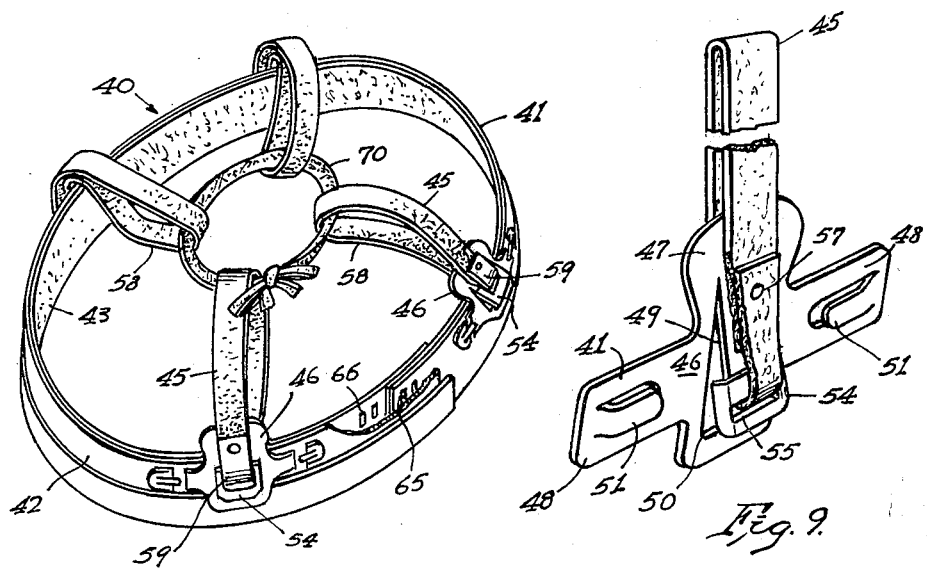
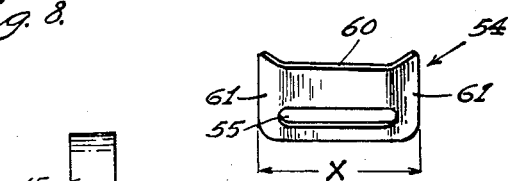
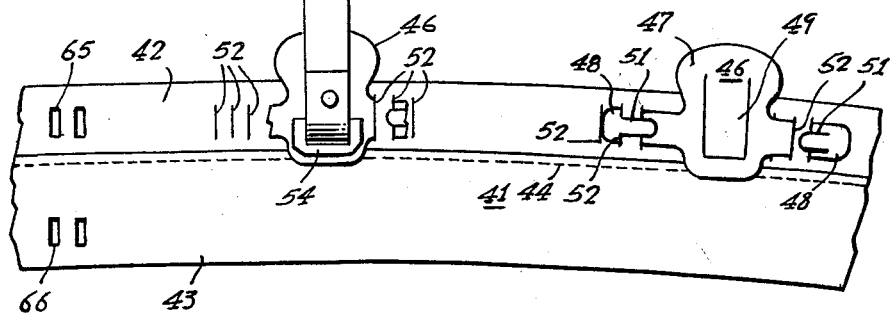

United States Patent Office 2,931,042
Patented Apr. 5, 1960

2,931,042

PROTECTIVE HEADGEAR AND METHOD OF MAKING IT

Harry W. Austin, Monroeville, Pa., assignor to Mine Safety Appliances Company

Application April 27, 1954, Serial No. 425,925

5 Claims. (Cl. 2—3)

This invention relates to headgear and more particularly to protective or safety headgear of the nonmetallic type for use in industry.

In the past, considerable difficulty has been experienced in manufacturing nonmetallic protective headgear with suspensions or suspension means which are efficient in all major aspects when incorporated in the headgear to carry a headgear lining. The efficiency of such suspensions is predicated, for example, upon optimum quality suspensions and upon the method and means of incorporation of such suspensions in the headgear in a manner to avert or greatly minimize injuries to the head of the wearer should the headgear receive an external blow at or adjacent the points of suspension.

These problems are most prevalent when protective headgear are fabricated from reinforced plastic materials. The plastic materials are normally of the type which, when molded, become rigid and serve to provide an excellent head protective device because of the good wear, weight and dielectric characteristics. The resistance to impact of the pure plastics, however, is not usually sufficient to withstand external blows occurring from falling objects. Consequently, it is necessary to reinforce the plastics with a media, such as glass fibers, cotton, nyon, asbestos, and paper in a woven form or distributed as individual fibers. When the plastics are so reinforced, the problem of providing efficient lining suspensions had not been heretofore solved. Headgear of this type are normally fabricated by either injection, transfer or compression molding. None of these fabrication methods, however, have proved satisfactory for molding the suspensions on the headgear in one step when reinforced plastics are used, since the physical characteristics of the reinforcement and the distance to be traveled is such that the reinforcement will not follow the flow of the plastic material during the molding process. If, for example, sheets of reinforcement are employed, it is obvious that the reinforcement is not capable of flowing into the small areas of the mold which form the suspensions. Similarly, when individual fibers are employed as the reinforcement media for the plastic material, the flow characteristics of the fibers are such that they will not be evenly distributed at critical areas, namely, at suspension points, regardless of whether the molding process is of the injection, transfer or compression type. Thus, the finished headgear will contain portions which do not contain the reinforcing material, and the headgear at these portions will be extremely weak and brittle compared to those portions and points which contain the reinforcing media.

The strength of the completed headgear is predicated, among other things, upon the types of reinforcement and the dimensional characteristics of the reinforcement. When using individual fibers as the reinforcing media, it is preferable to use what is commonly known as long fiber reinforcement since this provides a much stronger headgear than does the short fiber reinforcement. As the length of the fiber is increased, the proper distribution of the fibers becomes more difficult in the molding process since the flow characteristics of the fibers decrease, for a given distance of travel, due to its increased length. However, the long fiber is needed to provide the necessary strength in the headgear and becomes the preferred type of reinforcement. The injection or transfer type molding has not been found to be suitable when employing the individual long fiber reinforcement or woven fiber reinforcement, and as a consequence thereof, it is preferred in most cases to use compression type molding; but, as mentioned above, such reinforcement will not flow to the critical areas as required even when using compression type molding. Thus, satisfactory suspension means cannot be formed in a headgear which is to include such reinforcement by merely selecting a compression type molding. Also, the prior art lining suspensions are not suitable for incorporation in the headgear because, for example, of poor bonding qualities, poor dielectric qualities, suspensions cannot be properly positioned in the headgear in a manner to minimize head injuries and do not provide a positive and strong supporting means for the headgear lining.

Additionally, past experience has indicated that the headgear linings now employed are inadequate for properly supporting the headgear on the head of the wearer and to provide a safe and comfortable fit for all head sizes. Further, the present day linings are normally of such construction as not to permit the replacement of parts which are quickly worn out, thus, necessitating costly replacement of a major portion of or a complete lining.

Accordingly, it is the general object of this invention to provide a solution to the foregoing problems and difficulties by providing a method by which a protective headgear may be formed of plastic material and contains improved suspension means for supporting a headgear lining. This invention further contemplates an improved method of fabricating suspension means and a method by which the suspension means may be incorporated in the headgear during the headgear molding process.

It is a further object of this invention to provide a method by which a headgear may be molded of plastic material reinforced with a fibrous material, the method including the preforming of plastic suspension means and incorporating the suspension means into the headgear during the molding process.

Another object of this invention is to provide a protective headgear composed of reinforced plastic materials and having suspension means formed of reinforced plastics to provide a support for the headgear lining.

A further object is to provide an improved headgear lining which will positively support the headgear on the head of the wearer and will provide a safe and comfortable fit for all head sizes and constructed in a manner whereby parts thereof may be easily replaced and inexpensively manufactured.

Other objects and advantages will become apparent from the following description and annexed drawings in which:

Fig. 1 shows a side elevation of a protective headgear according to the invention;

Fig. 2 is a plan view of the headgear showing the inside construction thereof;

Fig. 3 shows the front, top and end views of one preformed suspension;

Fig. 4 is a sectional elevation of the molds, with the male mold taken on line IV—IV of Fig. 5, for forming the headgear suspensions but of smaller scale than the suspension shown in Fig. 3;

Fig. 5 is a plan view of the male mold taken on line V—V of Fig. 4;

Fig. 8 is a perspective view with parts broken away of the headgear lining;

Fig. 9 is a perspective view with parts broken away of a portion of the lining;

Fig. 10 represents a plan view with parts broken away of an unfolded portion of the lining shown in Fig. 8;

Fig. 11 is a perspective view of a lining clip;

Fig. 12 is a sectional elevation of part of the lining as attached to the headgear;

Fig. 13 is an enlarged fragmentary view of one of the headgear suspensions and a portion of the lining as viewed on line XIII—XIII of Fig. 12; and Fig. 14 is an enlarged fragmentary view of a modified form of the suspension of Fig. 13.

Figure 6:
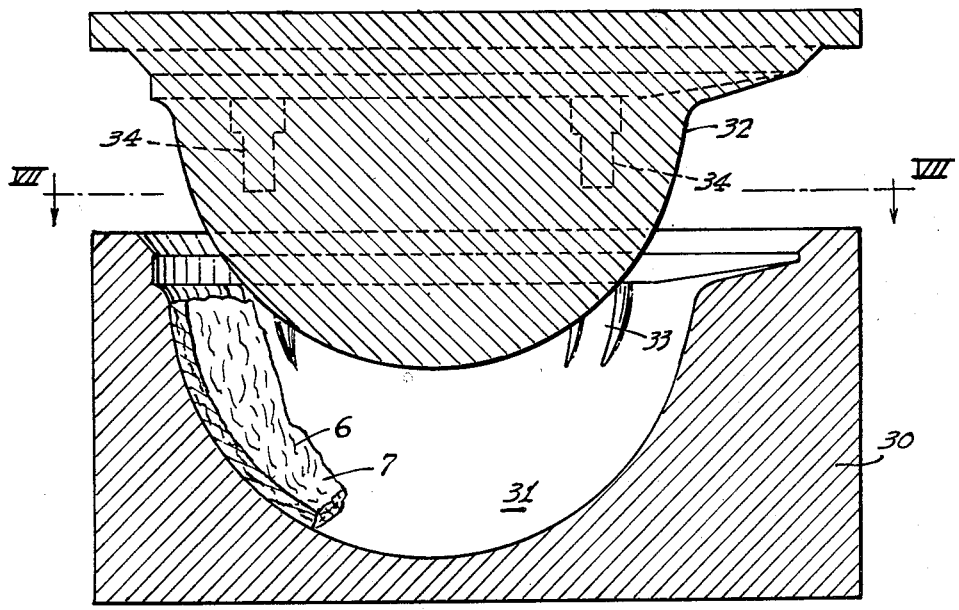
Fig. 6 is a sectional elevation of the headgear mold with parts in vertical elevation.

The invention will be described and is illustrated as relating to a headgear which is composed of glass fibers bonded together by a thermosetting polyester resin, but it is to be clearly understood that the invention is not limited to these materials and is equally applicable to a headgear composed of unreinforced plastic or to a plastic headgear having fibers other than glass as the reinforcing media; for example, the reinforcing media may include such fibrous materials as cotton, wool, rayon, hemp, asbestos, nylon and paper. Various plastics are known which are suited for use in the practice of this invention. These include, among others, plastics from both thermosetting and thermoplastic groups, as for example, polyesters, rubber, casein and cellulose, numerous examples of which are known and commonly found in industry. Preferably, however, headgear of this invention is made from plastics of the thermosetting type comprising resins formed from any of the various condensation or polymerization reactions known in the art and which are initially plastic and moldable and which, after being subjected to heat and pressure, become very hard, infusible, nonconducting, insoluble in organic solvents, dilute acids and alkali and inert to steam. In the condensation group are such commonly used resinous materials as the phenolics, ureas, melamines, and resorcinols which react with aldehydes or the like. The polymerization type includes such resinous materials as the allyl alcohols and their derivatives, polystyrenes, and the polyesters and combinations or copolymers of the above. Also, the fibers may be woven or unwoven and molded into the headgear in a orientated or unorientated manner.

Noting Figs. 1 and 2, the headgear 1 comprises a crown 2 and a visor 3. The headgear, of course, is not limited to this shape and may take the form of a headgear having only a crown or one having a continuous brim around the crown. The inner surface 4 of the crown includes identical suspensions 5 in the form of slotted inverted T-shaped members described more fully hereinafter. Inner surface 4 of the headgear is free of any projections extending from the surface inwardly toward the head of the wearer. As best seen in Fig. 13, the headgear is composed of unorientated glass fibers 6 bonded together by a thermosetting polyester resin 7. Fibers 6 extend throughout the resin to provide a reinforced headgear capable of withstanding considerable punishment inflected by sharp or blunt objects.

Headgear suspensions 5 each comprise a curved surface 8 conforming in shape to a curved section of the inner surface 4 of the crown when bonded thereto and is interrupted by a T-shaped slot 9 formed by a vertical leg 10 and a horizontal crossbar 11 having end portions 11a. The slot 9 provides a mounting and anchoring means for a headgear lining. Suspension 5 has a backing 13 of fabric bonded as an integral part thereof when molded. The central portion 14 and integral wings 15 of backing 13 are shaped by compound curves as is readily seen in Fig. 13 and in the top and end views of Fig. 3, thus providing a smoothly curved and pleasing appearance to the outer surface of the headgear in its completed form. Suspension 5 is inverted when affixed in the crown of the headgear to provide an inverted T-shaped suspension. As illustrated, the headgear 1 contains four suspensions, but it is readily understood that a lesser or greater number of suspensions may be incorporated in the headgear depending upon the number of points at which it is desired to mount the headgear lining.

The headgear suspensions are formed by molds such as shown in Figs. 4 and 5. Molds 16 comprise a male mold 17 and a complementary female mold 18 and include dowels 19 (only one shown) fitted into holes 20 for properly positioning the molds together. The male mold 17 has a convex surface 21 complementary to the concave surface 22 of the female mold and contains a T-shaped protrusion 23 extending outwardly therefrom. The T-shaped protrusion 23 is formed by a vertical leg 24 and a horizontal crossbar 25 having end portions 25a. These end portions 25a are spaced from the convex surface 21 as seen in Fig. 4. Each suspension is molded by first placing a sheet of fabric 13 across the concave surface or cavity 22 of the female mold 18 and by secondly placing a mass 26 of fibers 6 impregnated with resin 7 on top of the fabric. This mass of fibers may take the form of a mat or sheet of fibers dipped into or otherwise impregnated with resin, or the mass, for example, may be untreated with the resin being placed on the mass in solid or liquid form before the molds are closed. The male mold 17 is then placed in mating relationship with female mold 18 by positioning pins 19 into holes 20 and thereby compressing the materials between the molds. When pressure is applied to the molds under the conditions of heat, if necessary, the resin and fibers are thoroughly intermingled and bonded to the fabric, the fabric being preferably of a coarse texture to provide better bonding between the resin and the fabric. As pressure and/or heat is applied, the fibrous resin readily flows around the T-shaped protrusion 23 and easily fills up the space under end portions 25a. Due to the short distance of travel and the minimum number of small areas to be penetrated, the fiber reinforcement will flow with the resin without difficulty even when long fiber reinforcement is employed.

Upon disengagement of the molds, the rigid suspension 5 of Fig. 3 is formed containing the T-shaped slot 9 conforming to the shape of the T-shaped protrusion 23 on the male mold 17. The fabric backing 13 of the suspension conforms to the concave shape of the female mold 18 and provides a surface for bonding the suspension to the headgear. The fabric 13 is preferably of a width equal to the distance between shoulder 27 and holes 20 of the male mold, and its length may be such as to extend beyond the sides of the mold for trimming to any desired final length. Obviously, any portion of the fabric outside of the molding area will be in its original state, that is, unaffected by impregnated fibers and resin to thus present additional bonding surfaces through its entire thickness. Consequently, it is sometimes advantageous to leave unaffected portions of the fabric on the suspensions to provide an even greater bonding surface for affixing the suspensions to the crown of the headgear. Fig. 14 shows a suspension 28 having a fabric portion 28a extended to provide additional bonding surfaces. The suspension 5 is removed from male mold 17 by merely sliding it away from shoulder 27. It is thus seen, according to the above teaching, that suspension means may be readily fabricated to contain, among other advantageous qualities, the required strength characteristics.

Figure 7:
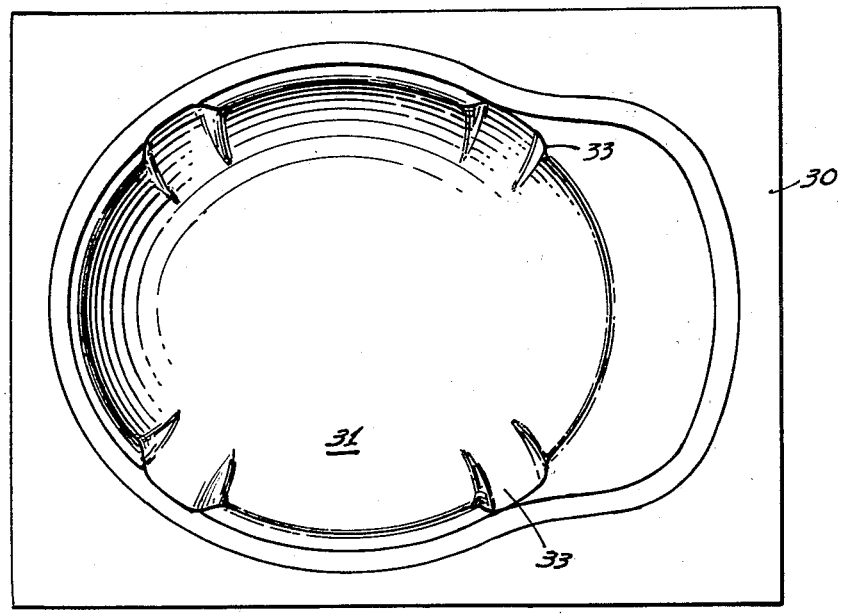
Fig. 7 is a plan view of the female mold taken on line VII—VII of Fig. 6.

The method of molding the protective headgear 1, including the suspensions 5, will now be described, and reference is made to Figs. 6 and 7 which show a female mold 30 having a cavity or depression 31 similar to the outer surface shape of the headgear 1 and a male mold 32 conforming in shape to the inner surface 4. The female mold comprises four concave depressions 33 and male mold contains four complementary circumferentially spaced T-shaped protrusions 34 (only two shown) similar to the one shown at 23 in Figs. 4 and 5.

When the molds are in the open position and a headgear is to be molded, preformed suspensions 5 are slid snugly and upwardly over each of the T-shaped protrusions 34. A mass of fibers 6 is placed in the depression 31 and the resin 7 is applied to the fibers. The fibers may be first spun to substantially the same shape as the depression 31, contained in mat form or merely positioned in the mold as individual fibers. The fibers may be preimpregnated with a resin or the resin may be placed in the mold subsequent to the positioning of the fibers in the depression 31. Upon compressing the molds together, with or without the influence of heat, the heat, if any, required being dependent upon the type of fibers and plastic used, the resin and fibers will commingle and pervade the space between the molds, and between the backing 13 of each suspension 5 and its complementary depression 33. When the molds are disengaged and after the formed headgear 1 is allowed to somewhat cool, the headgear is taken from the mold and is in the form shown in Figs. 1 and 2. The headgear may be molded under various pressures and temperatures, which, of course, are dependent upon the type of plastic used and the type of molding desired. For example, in bag molding, very low pressures such as 12 pounds per square inch or lower may be used with temperatures in the vicinity of 70° F., and for high compression molding, pressures and temperatures around 5,000 pounds per square inch and 370° F. may be employed. It has been found that excellent results are obtained in the molding process when pressures of 2,000 to 3,000 pounds per square inch and temperatures of 200° to 300° F. are used, but it is to be understood that the invention is not limited to any specific values since these values are a matter of obvious design.

From the above, it can be clearly discerned that, by the practice of this invention, problems and difficulties heretofore encountered are solved constituting what is considered an extremely progressive advance in the art. Not only is it now possible to provide a headgear that meets the rigid requirements of industry for protective headwear, but also practical fabrication methods are now feasible which will produce this widely required head protection.

In order to support the headgear upon the head of a wearer, a novel lining is proposed which is positive in its support, extremely flexible in adjustment and facilitates replacement of component parts. Referring to Figs. 8 to 13, the headgear lining 40 comprises a sweatband 41 including a cradle tab mounting portion 42 and a head engaging portion 43. The portions 42 and 43 may be formed, as shown in Fig. 10, in two pieces attached together as by stitching 44 or by cementing and the like, or these portions may be parts of a one-piece material. The lining 40 may be made of any of the materials well known in the art. Cradle straps 45 are releasably attached to portion 42 by cradle strap supports or tabs 46 and are adjustably and releasably connected together by a cord 70 at the upper ends thereof. The lower ends of the straps 45 each support a mounting clip 54 having an aperture 55 and the clip being further constructed for attachment into a slot 9 as hereinafter more fully described. Each tab 46 is preferably made of a material which is flexible but contains some rigidity to provide stability to the lining and comprises a main body portion 47 and arms 48. Each body portion 47 includes a tongue 49 stamped therefrom to form an aperture 50, the tongue and aperture providing cradle strap attachment means. Each of the arms 48 also has a tongue 51 stamped therefrom to provide a locking means for the tab when the arms 48 are inserted into slits 52 of sweatband portion 42. Once the arms 48, including their tongues 51, are inserted completely through slits 52, the tongues are then placed in overlying relation to said slits to releasably lock the tabs 46 on said sweatband portion 42. Although the tabs are locked in position, limited movement to each side is provided to permit self-seeking adjustment when other parts of the lining are varied. As shown in Fig. 10, a plurality of slits 52 are provided so that the tabs may be circumferentially varied on the sweatband portion 42. Each cradle strap 45 is attached to its respective tab 46 (Fig. 12) by inserting one free end 53 of the strap down through aperture 50 of tab 46 and then looping this end around tongue 49. End 53 is then inserted into aperture 55 of clip 54 for attachment to the other free end 56 of the cradle strap by a fastener 57. The fastener 57 may be of the permanent or detachable type and pierces tongue 49 to provide anchoring means for both ends of the cradle strap. The portion of each cradle strap above the fastener 57 constitutes a head engaging loop 58, and the cradle strap portion below the fastener constitutes a clip carrying loop 59, including portion 59a. Each of the clips 54 (Fig. 11) comprises a medial portion 60 having the aperture 55 formed therein and angularly disposed end portions 61. The clips 54 may be made from various substantially inelastic and deformable materials, such as metal and plastic, and each clip is of such normal length when not attached to the cradle strap as to loosely fit the length of each crossbar 11 of slots 9. That is, length $x$ of the clip (Fig. 11) is less than length $y$ of the crossbar (Fig. 13). The width $z$ of a crossbar 11 is of such dimension as to freely accommodate only a clip 54 but will not also freely accommodate the thickness portion 59a of its cradle strap 45 unless the clip is deformed to provide the necessary clearance for the thickness of portion 59a. As each clip 54 and its strap portion are inserted into a crossbar 11, the end portions 61 of the clip will deform or be bent toward coplanar relationship with the medial portion 60, pressing the end portions 61 into tight engagement with the crossbar end portions 11a. Noting Figs. 8 and 10, the sweatband 25 includes mating holes 65 and 66 for the purpose of threadedly receiving an adjusting cord (not shown) or the like for varying the size of the sweatband to accommodate various head sizes.

Accordingly, the operation of attaching the lining to the headgear and proper adjustment thereof is very simple. It is merely necessary to insert each of the clips 54 into the respective suspensions 5 by applying a small amount of pressure to deform the clips. The cord 70 may be loosened or tightened to conform the head engaging loops 58 to the head of the wearer and space the top of crown 1 away from the cradle straps. Sweatband 41 may then be adjusted according to the desired head size and the tabs 46 may be moved, if necessary, by selecting the desirable slits 52. Adjustment of the tabs is not usually necessary since limited circumferential movement is provided between the arms 51 of a tab and any pair of sweatband slits 52.

The construction of the lining with its various adjustments and headgear attachment features facilitates selection of a comfortable fit for all working conditions and assures proper spacing from the headgear for maximum head protection.

It is pointed out that the terms, pressure and heat, are used in their broadest sense. Pressure and/or heat may be provided from the reaction of the molding materials themselves or may be applied from an external source. As long as the plastics and fibers employed are of a compatible nature, it is within the scope of this invention to select any desirable combination of materials for producing the headgear. The headgear may be made in many shapes or forms and may be employed in its natural state, or coloring may be added during or after the molding process.

Having explained the principle of the present invention and having illustrated and described what is considered to be the best embodiment, it is to be understood that, within the scope of the appended claims, the invention may be practiced otherwise than as specifically illustrated and described.

I claim:

1. A protective headgear comprising a crown composed of fibers bonded together with a plastic, lining suspension means of the same material as said crown and united therewith through a fabric medium, said suspension means having downwardly opening slots for upward reception of headgear lining mounting means, and said suspension means being so disposed as to provide a crown having an inner surface entirely free of inward projections.

2. A protective headgear comprising a crown composed of fibers bonded together with a plastic, a plurality of lining suspension means of the same material as said crown and uniting therewith through a fabric medium, and said suspension means being positioned adjacent the lower portion of the headgear and having downwardly opening slots for upward reception of headgear lining mounting means.

3. The method of forming protective headgear by complementary female and male molds contoured to provide crown and brim portions, the male mold having predetermined spaced protrusion means adjacent its outer end and the female mold having depression means adjacent its outer end complementary to said protrusions, comprising the steps of positioning a mass of fibrous material in the female mold, applying a plastic to said material, preforming rigid lining suspension means for supporting a headgear lining which includes making a slot in one surface of said suspension means to fit over said protrusion means and providing a mating surface on said suspension means for said depression means, positioning said rigid suspension means on said protrusion means with the slot mating with the protrusion means, and compressing the molds for intermingling the fibrous material and plastic and for consolidating the materials within the molds to form a rigid fiber reinforced plastic headgear having spaced slotted suspension means affixed around the lower portion thereof.

4. The method of forming protective headgear by complementary female and male molds contoured to provide crown and brim portions, comprising the steps of positioning a mass of fibers in the female mold, applying a plastic to said mass, preforming rigid lining suspension means for supporting a headgear lining which includes providing means for attachment with headgear lining mounting means by applying a plastic material having reinforcing fibers to a sheet of fabric and compressing the material and fabric to flow said material on said fabric for consolidation into a rigid suspension means, positioning said rigid suspension means on the male mold at predetermined spaced points adjacent its outer end with said attachment means against the mold, and compressing the molds for intermingling the first-mentioned fibers and plastic and for consolidating the materials within the molds to form a rigid fiber reinforced plastic headgear having spaced suspension means affixed around the lower portion thereof.

5. The method of forming protective headgear by complementary female and male molds contoured to provide crown and brim portions, the male mold having predetermined spaced T-shaped protrusion means adjacent its outer end and the female mold having depression means adjacent its outer end complementary to said protrusions, comprising the steps of positioning a mass of fibrous material in the female mold, applying a plastic to said material, preforming rigid lining suspension means for supporting a headgear lining which includes making a T-shaped slot in one surface of said suspension means to fit over said protrusion means and providing a mating surface on said suspension means for said depression means, positioning said rigid suspension means on said protrusion means with the T-shaped slot mating with the T-shaped protrusion means, and compressing the molds for intermingling the fibrous material and plastic and for consolidating the materials within the molds to form a rigid fiber reinforced plastic headgear having spaced slotted T-shaped suspension means affixed around the lower portion thereof.

References Cited in the file of this patent

UNITED STATES PATENTS

| Number | Name | Date |
|---|---|---|
| 1,352,739 | Egerton | Sept. 14, 1920 |
| 1,475,623 | Egerton | Nov. 27, 1923 |
| 1,504,547 | Egerton | Aug. 12, 1924 |
| 1,875,143 | Punton | Aug. 30, 1932 |
| 1,914,273 | Meurling | June 13, 1933 |
| 2,025,772 | Punton | Dec. 31, 1935 |
| 2,172,499 | Chassaing | Sept. 12, 1939 |
| 2,184,132 | Todd | Dec. 19, 1939 |
| 2,295,855 | Ludwell | Sept. 15, 1942 |
| 2,339,080 | Karabin | Jan. 11, 1944 |
| 2,363,933 | Bendix | Nov. 28, 1944 |
| 2,415,214 | Lewis | Feb. 4, 1947 |
| 2,420,522 | Daly | May 13, 1947 |
| 2,420,937 | Dauster | May 20, 1947 |
| 2,423,076 | Daly | July 1, 1947 |
| 2,525,469 | Anderson | Oct. 10, 1950 |
| 2,531,843 | Durey et al. | Nov. 28, 1950 |
| 2,585,937 | Johnson et al. | Feb. 19, 1952 |
| 2,589,755 | Ward et al. | Mar. 18, 1952 |
| 2,609,539 | Shearer | Sept. 9, 1952 |
| 2,710,026 | Stewart et al. | June 7, 1955 |
| 2,739,309 | Frieder et al. | Mar. 27, 1956 |
| 2,741,768 | Ruggiero | Apr. 17, 1956 |
| 2,746,049 | Hudson | May 22, 1956 |
| 2,781,517 | Fisher | Feb. 19, 1957 |
| 2,796,609 | Fisher et al. | June 25, 1957 |

FOREIGN PATENTS

| Number | Country | Date |
|---|---|---|
| 996,612 | France | Sept. 5, 1951 |